United States Patent
Van Der Knaap et al.

(10) Patent No.: US 8,308,170 B2
(45) Date of Patent: Nov. 13, 2012

(54) ACTIVE SUSPENSION ASSEMBLY FOR A VEHICLE

(75) Inventors: Albertus Clemens Maria Van Der Knaap, Helmond (NL); Arjan Pieter Teerhuis, Eindhoven (NL); Raymond Bernardus Gerhardus Tinsel, Eindhoven (NL); Robert Marijn Anthony Frank Verschuren, Eindhoven (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 485 days.

(21) Appl. No.: 12/446,474

(22) PCT Filed: Oct. 23, 2007

(86) PCT No.: PCT/EP2007/061366
§ 371 (c)(1),
(2), (4) Date: Oct. 15, 2009

(87) PCT Pub. No.: WO2008/049845
PCT Pub. Date: May 2, 2008

(65) Prior Publication Data
US 2010/0301571 A1    Dec. 2, 2010

(30) Foreign Application Priority Data
Oct. 23, 2006 (EP) .................................. 06076930

(51) Int. Cl.
*B60G 17/015* (2006.01)

(52) U.S. Cl. ...................................... 280/5.507; 280/5.5

(58) Field of Classification Search ............... 280/5.507, 280/5.508, 5.5
See application file for complete search history.

(56) References Cited

FOREIGN PATENT DOCUMENTS

| | | |
|---|---|---|
| DE | 3707085 A1 | 9/1987 |
| DE | 3718390 A1 | 12/1987 |
| DE | 3734697 A1 | 7/1988 |
| DE | 4317510 A1 | 12/1993 |
| DE | 19528565 A1 | 2/1996 |
| DE | 19727819 A1 | 1/1999 |
| FR | 2100284 | 2/1972 |
| GB | 2319760 A1 | 6/1998 |
| WO | 9322150 | 11/1993 |
| WO | 2006019298 A1 | 2/2006 |

*Primary Examiner* — Eric Culbreth
(74) *Attorney, Agent, or Firm* — Hoffmann & Baron LLP

(57) ABSTRACT

The invention relates to an active suspension assembly and a vehicle equipped therewith. The assembly comprises a bearing arm, spring and adjusting mechanism. In use, the bearing arm supports the second vehicle mass, for instance a cabin or wheel and is pivotally connected to the first vehicle mass, for instance a chassis, around a pivot axis; the spring mechanism produces a spring force that exerts a counter moment on the bearing arm that can counterbalance any external moment acting on said bearing arm; and the adjustment mechanism is arranged to vary said counter moment by altering the direction of the spring force and/or move its point of application in a first direction. The adjustment mechanism is furthermore arranged to move the point of application of the spring force in a second direction, in which the counter moment is not or hardly affected, but by which the effective spring stiffness of the suspension assembly is affected. Thanks to said latter movement, the effective stiffness of the suspension can be maintained at a desired value.

22 Claims, 7 Drawing Sheets

ACTIVE SUSPENSION ASSEMBLY FOR A VEHICLE

This application is the U.S. National Phase of, and Applicants claim priority from, International Application Number PCT/EP2007/061366 filed 23 Oct. 2007 and European Patent Application No. 06076930.4 filed 23 Oct. 2006, all of which are incorporated herein by reference.

BACKGROUND OF THE INVENTION

The invention relates to a suspension assembly for a vehicle, for suspending a second vehicle mass, such as a cabin or wheels, to a first vehicle mass, such as a chassis. More particularly, the invention relates to an active suspension assembly, arranged to actively counterbalance external loads acting on said suspended vehicle mass.

Such a suspension assembly is for instance known from WO 93/22150 and WO 2006/019298. The known assembly comprises a bearing arm, which at one end is pivotally connected to a chassis of the vehicle and at another end is associated to a cabin or wheel. Spring means are provided to produce a spring force that can exert a moment on the bearing arm, in order to counteract an external moment acting on said bearing arm due to for instance lateral, longitudinal and/or vertical accelerations of the vehicle (roll, pitch and heave respectively). Adjustment means are provided to alter a direction and/or the point of application of the spring force, so as to decrease or increase the counter moment on the bearing arm.

A disadvantage of this known suspension assembly is that the effective spring stiffness of the suspension assembly depends to a large extent on the instantaneous position of the point of application of the spring force. When this point of application is located near the pivot axis, the effective spring stiffness may generally be low, while it may be relatively high while the point of application is located near the opposite end of the bearing arm. Both situations may result in undesirable and/or uncomfortable drive behaviour.

It is therefore an objective of the invention to provide a suspension assembly of the above-described type, in which the disadvantage of the known assembly is overcome or at least reduced, while retaining the advantages thereof.

To this end a suspension according to the present invention is characterized by the features of claim 1.

SUMMARY OF THE INVENTION

Applicant has found, through simulations and testing, that the point of application of the spring force can be moved in a second direction, in which the counter moment will be not or hardly affected, but the effective spring stiffness will be affected. Accordingly, the effective spring stiffness can be controlled substantially independent of the counter moment. Undesirable changes in the effective spring stiffness, caused by moving the point of application of the spring force in a first direction to produce a desired counter moment, can be at least partly compensated, by moving the point of application in the appropriate second direction, over a predetermined distance. Thus, external load disturbances arising from lateral, longitudinal and/or vertical vehicle accelerations can be effectively suppressed, while at the same time the effective spring stiffness can be kept at a desired level.

According to an aspect of the invention, the adjustment means can be arranged to move the point of application of the spring force along a predetermined path, designed to maintain the effective spring stiffness at a substantially constant level, while varying the counter moment on the bearing arm. This may enhance driving comfort and furthermore may obviate the need for a complex, costly and energy consuming control mechanism that otherwise would have to be implemented to maintain the effective stiffness within desired boundaries.

According to an alternative embodiment of the invention, the adjustment means can be arranged to move the point of application of the spring force along a predetermined path, that causes the effective spring stiffness to increase, when the counter moment is increased in order to counteract an increased external load. Thanks to such increased effective spring stiffness, the natural frequency of the sprung mass can remain substantially constant, which again may contribute to the overall comfort of the vehicle. It furthermore allows the suspension assembly according to the invention to replace a conventional air spring, which features this same functionality.

According to an advantageous aspect of the invention the spring force may be exerted on the bearing arm via an elongated member, for instance a flexible string or a stiff rod. This allows the suspension assembly to be compactly built. An end of the elongated member may be received within the spring means, whereas the other end may be moved along a circular path, thereby causing the elongated member to describe a cone, or at least a part thereof.

Preferably, the elongated member is aligned with the centre line of the spring means under static load conditions. Thanks to such aligned position, radial or lateral loads on the elongated member are minimized. Especially frictional forces, acting between said elongated member and a bearing that supports the elongated member within the spring means will be minimized.

The invention furthermore relates to a vehicle equipped with a suspension assembly according to the invention, wherein the suspension assembly is used to suspend a cabin and/or the wheels of the vehicle to a chassis of the vehicle.

Further advantageous embodiments of an active vehicle suspension assembly according to the present invention and a vehicle equipped therewith are set forth in the dependent claims.

BRIEF DESCRIPTION OF THE DRAWINGS

To explain the invention, exemplary embodiments thereof will hereinafter be described with reference to the accompanying drawings, wherein.

DETAILED DESCRIPTION OF THE INVENTION

Figure 1A:
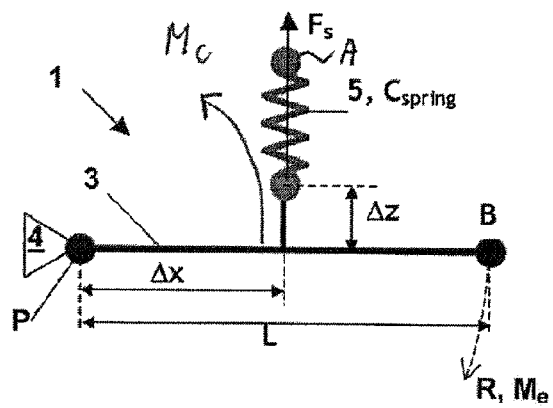
FIG. 1A shows a simplified suspension assembly according to the invention, with a theoretic spring force, produced by a 'pure spring', i.e. spring means having a spring stiffness but no pretension.
Figure 8:
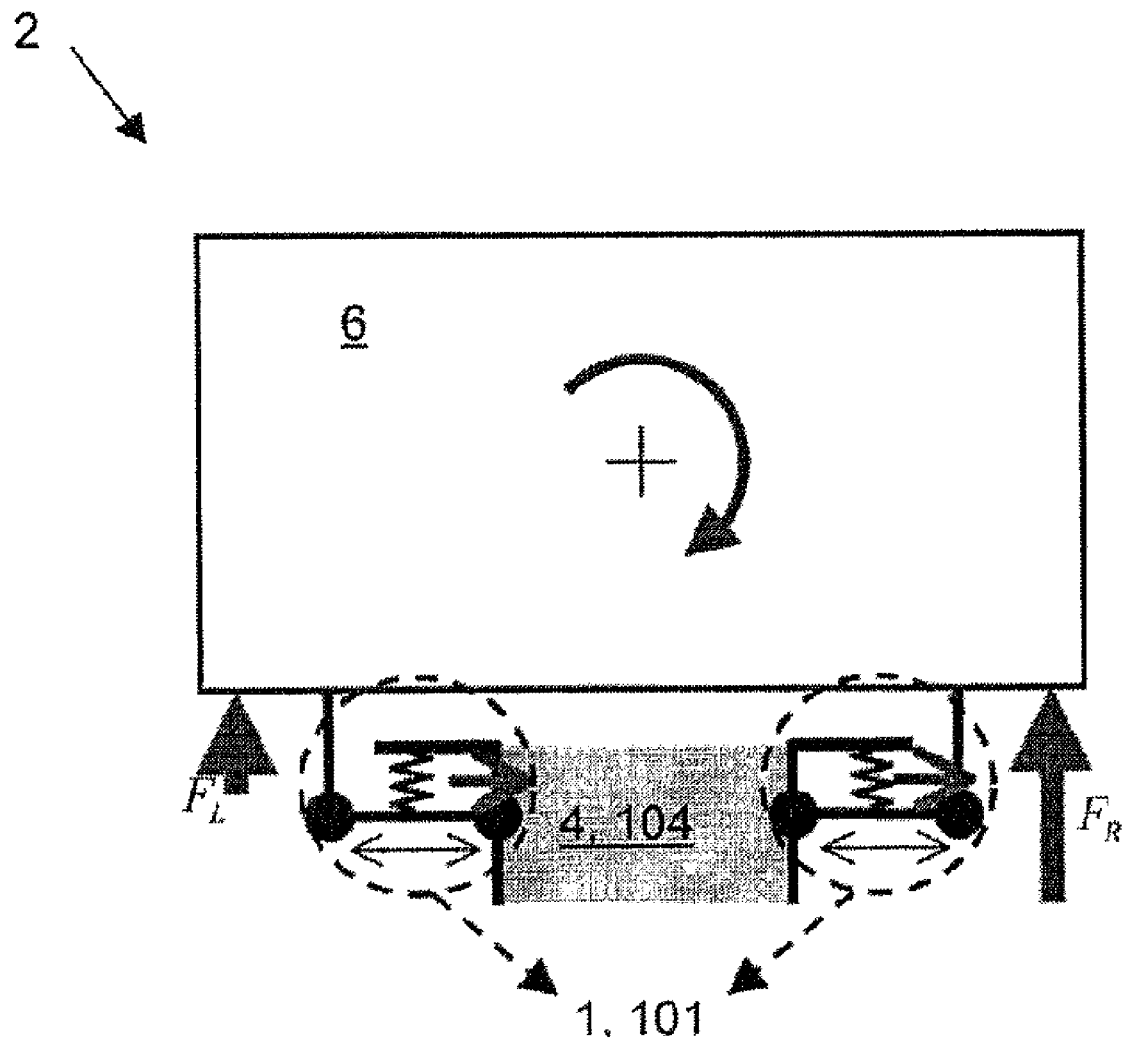
FIG. 8 schematically shows a vehicle, in frontal view, equipped with a suspension assembly according to the invention, applied in a cabin support system.

The basic inventive principle behind the present invention will first be explained with reference to a relatively simple, two dimensional suspension assembly 1, as shown in FIGS. 1A,B and 3. This suspension assembly 1 comprises a bearing arm 3 and spring means 5. The bearing arm 3 has a length L and is with one end pivotally connected to a chassis 4, around a pivot axis P. The other end is associated to for instance a wheel or a cabin 6 (as shown in FIG. 8). The spring means 5 exert a spring force $F_s$ on the bearing arm 3 which can be moved along the bearing arm 3 (in X-direction) towards the pivot axis P or away there from, so as to decrease, respectively increase a moment $M_c$ exerted on said bearing arm 3 by said spring force $F_s$. Thus, said moment $M_c$ can be adjusted to counterbalance an external moment $M_e$ that during use may act on the bearing arm 3. This displacement of the force $F_s$ has effect on the effective stiffness $C_{eff}$ of the suspension assembly 1. The effective stiffness $C_{eff}$ is the stiffness that is felt between two points of the suspension assembly 1, in particular between point A where the spring means 5 are attached to the chassis 4 and point B where the bearing arm supports the cabin 6.

Figure 1B:
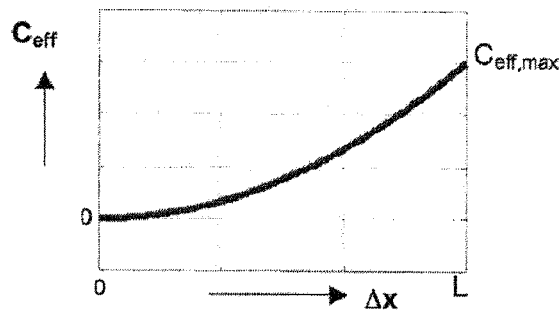
FIG. 1B shows the effective stiffness of the suspension assembly of FIG. 1A as a function of the position of the pure spring along the bearing arm.
Figure 1C:
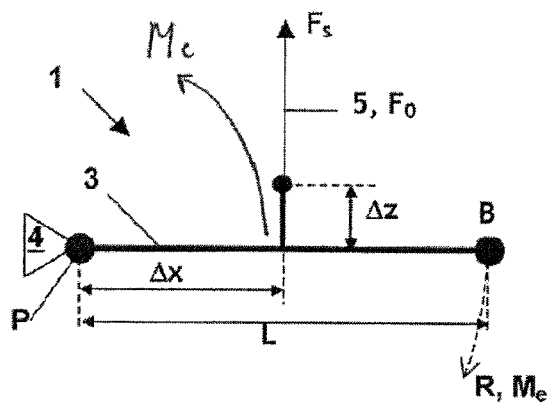
FIG. 1C shows the suspension assembly according to FIG. 1A, with a theoretic spring force, produced by a 'pure force', i.e. spring means having a pre-tension but no stiffness.

To show the effect of the displacement of force $F_s$ on the effective stiffness $C_{eff}$ of the suspension assembly 1, FIGS. 1A and 1C show two special, theoretical situations. In both situations, the spring means 5 exert a spring force $F_s$ on the bearing arm 3, wherein spring force $F_s$ is represented by following equation:

$$F_s = F_0 + C_{spring} * u \quad (1)$$

with $F_0$ representing the pretension, $C_{spring}$ representing the stiffness and u representing the elongation of the spring means 5.

In the theoretical situation according to FIG. 1A, the spring means 5 represents a 'pure spring', having a certain spring stiffness $C_{spring}$ but no pretension ($F_0=0$). The effective stiffness $C_{eff}$ at point B is given by the abovementioned equation (1), and can be seen to be independent of the position $\Delta z$ of the pure spring. In the theoretical situation according to FIG. 1C, the spring means 5 comprise a 'pure force', having a certain pretension $F_0$ but no stiffness ($C_{spring}=0$).

It can be shown that the effective stiffness $C_{eff}$ for both situations (FIG. 1A and C) can be expressed by following equation:

$$C_{eff} = \frac{C_{spring} \cdot \Delta x^2 + F_0 \cdot \Delta z}{L^2} \quad (2)$$

From this equation it can be seen that a pure spring (FIG. 1A), with $F_0=0$ and $C_{spring} \neq 0$, only affects the effective stiffness $C_{eff}$ when the spring is moved in X-direction, according to following parabolic relation:

$$C_{eff} = \frac{C_{spring}}{L^2} \Delta x^2 \quad (3)$$

This is illustrated in FIG. 1B, showing the effective stiffness $C_{eff}$ to increase parabolic from zero to $C_{eff,max}$ when the pure spring is displaced from the pivot axis P ($\Delta x=0$) to the end of the bearing arm 3 ($\Delta x=L$).

From equation (2) can furthermore be seen that a pure force (according to FIG. 1C) with $F_0 \neq 0$ and $C_{spring}=0$ only affects the effective stiffness $C_{eff}$ when this pure force is moved in Z-direction, according to following linear relation:

$$C_{eff} = \frac{F_0}{L^2} \Delta z \quad (4)$$

Figure 1D:
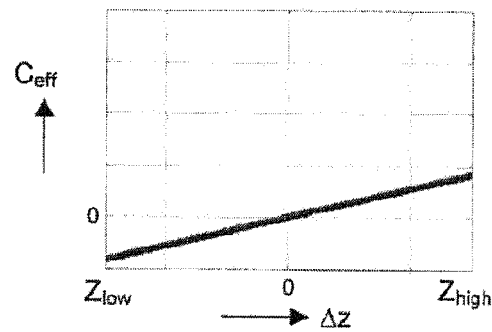
FIG. 1D shows the effective stiffness of the suspension assembly of FIG. 1C as a function of the position of the pure force in Z-direction, substantially perpendicular to the bearing arm.

This is illustrated in FIG. 1D, showing the effective stiffness $C_{eff}$ to increase linear from a negative value to a positive value, when the pure force is displaced from a position below the bearing arm 3 ($\Delta z = Z_{low} < 0$) to a position above the bearing arm 3 ($\Delta z = Z_{high} > 0$)

If a particular effective stiffness $C_{eff}$ is desired as a function of the displacement in X-direction, it can be derived from equation (2) that the corresponding displacement in Z-direction should be equal to:

$$\Delta z = \frac{1}{F_0} (C_{eff} \cdot L^2 - C_{spring} \cdot \Delta x^2) \quad (5)$$

Figure 2:
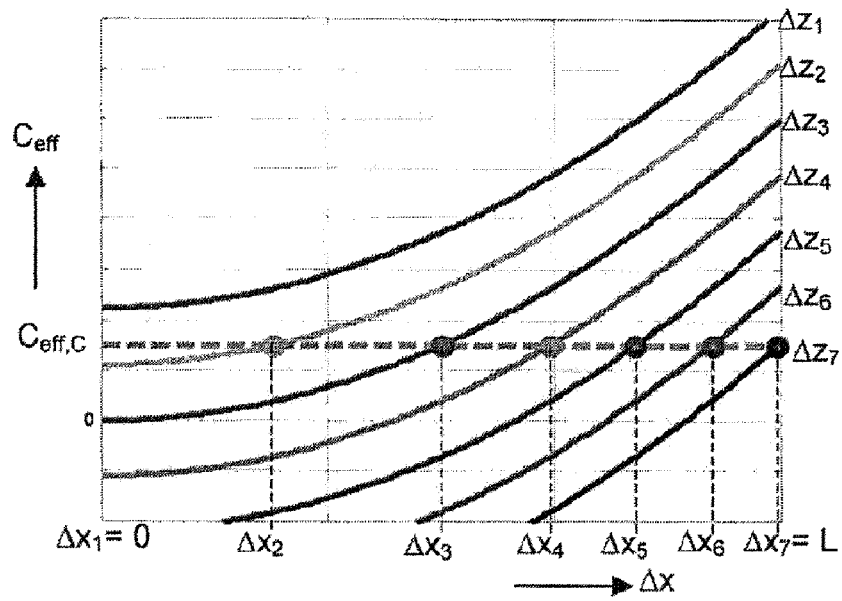
FIG. 2 shows the effective stiffness of the suspension assembly as a function of the X-position of a spring force produced by spring means having a pretension and a spring stiffness, for several Z-positions.
Figure 3:
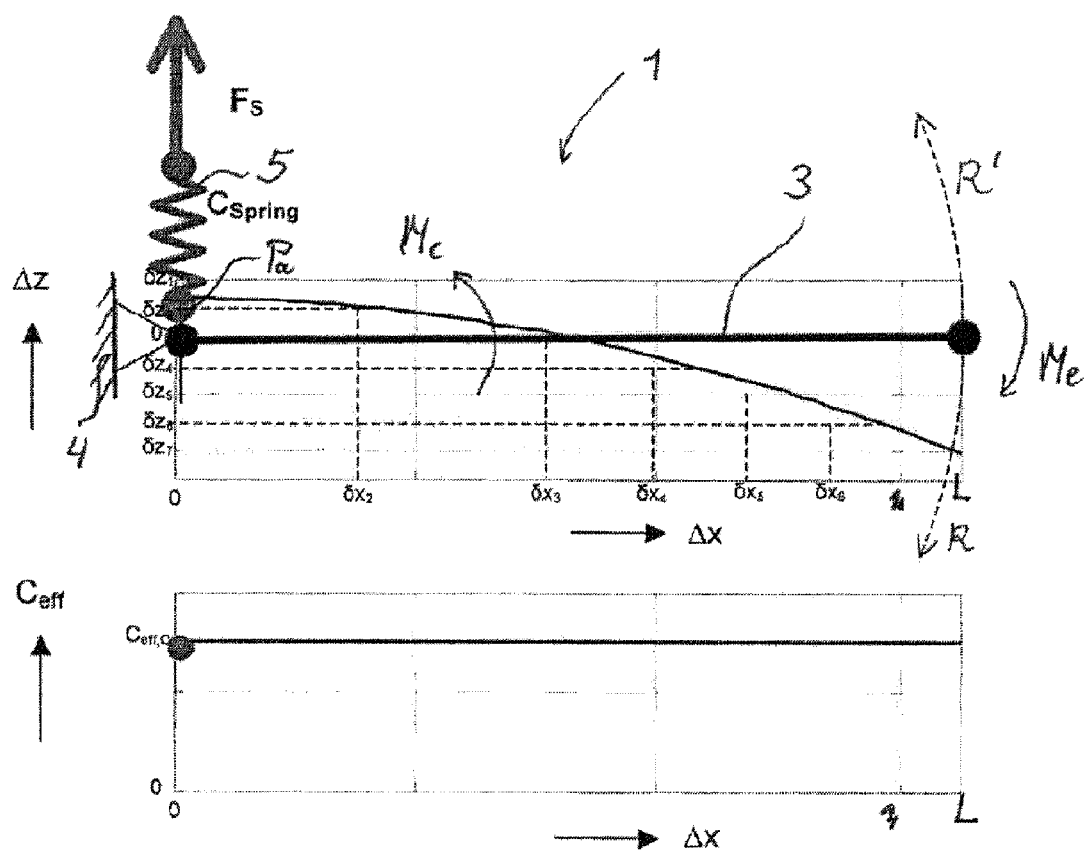
FIG. 3 shows the suspension according to FIGS. 1A,C, together with a two dimensional path along which a spring force can be displaced relative to the bearing arm, so as to maintain the effective stiffness of the suspension assembly at a desired, substantially constant value.

FIG. 2 represents the situation wherein the spring force $F_s$ has been displaced in Z-direction over a distance $\Delta z_1$ and subsequently has been displaced along the bearing arm 3, from $\Delta x=0$ to $\Delta x=L$. This has been repeated for several other Z-displacements $\Delta z_{2,...,7}$, wherein $\Delta z_3$ represents a Z-displacement of zero and $\Delta z_{4,5,6,7}$ represent negative Z-displacements, below bearing arm 3. From this FIG. 2 it can be seen that when the spring force $F_s$ is displaced in X-direction (to increase a counteracting moment on the bearing arm 3) the effective stiffness $C_{eff}$ of the suspension assembly 1 can be kept at a desired value $C_{eff,C}$ by simultaneously displacing the spring force $F_s$ downward in Z-direction over an appropriate distance $\Delta z$. The appropriate distance $\Delta z$ is given by the intersecting points of the dashed line $C_{eff,C}$ with the respective $C_{eff}$-curves. For instance, when the spring force $F_s$ is displaced in X-direction from position $\Delta x_2$ to $\Delta x_3$, the spring force $F_s$ should also be displaced in Z-direction from position $\Delta z_2$ to $\Delta z_3$. This is further illustrated in FIG. 3, showing the two-dimensional path along which the spring force $F_s$ can be displaced, in X- and Z-direction so as to maintain a substantially constant effective stiffness $C_{\mathit{eff}}$.

It will be understood that in a similar way the effective stiffness $C_{\mathit{eff}}$ can be controlled to vary linear with the X-displacement of the spring force $F_s$, or parabolic or according to some other desired curve. In such case the appropriate $\Delta x, \Delta z$-combinations can be found by plotting said desired curve in FIG. 2 and by noting down the coordinates of its intersection points with the $C_{\mathit{eff}}$-curves. Thus, the effective stiffness $C_{\mathit{eff}}$ may for instance be controlled to increase proportionally with the external load so as to maintain the natural frequency of the suspended vehicle mass constant. This may facilitate various control facilities provided in the vehicle, for instance workspace control, and/or enhance driver comfort.

The invention is thus based on the insight that the effective stiffness $C_{\mathit{eff}}$ and the counter moment $M_c$ can be adjusted to a large extent independent of each other. Hence it is possible to displace a spring force $F_s$ (or more particularly, its point of application $P_a$) towards or away from the pivot axis P of the bearing arm 3 to decrease, respectively increase the counter moment on said bearing arm 3, whereby unwanted variations in the effective suspension stiffness $C_{\mathit{eff}}$ can be suppressed or reduced by simultaneously displacing said point of application $P_a$ in an appropriate second direction.

Figure 9:
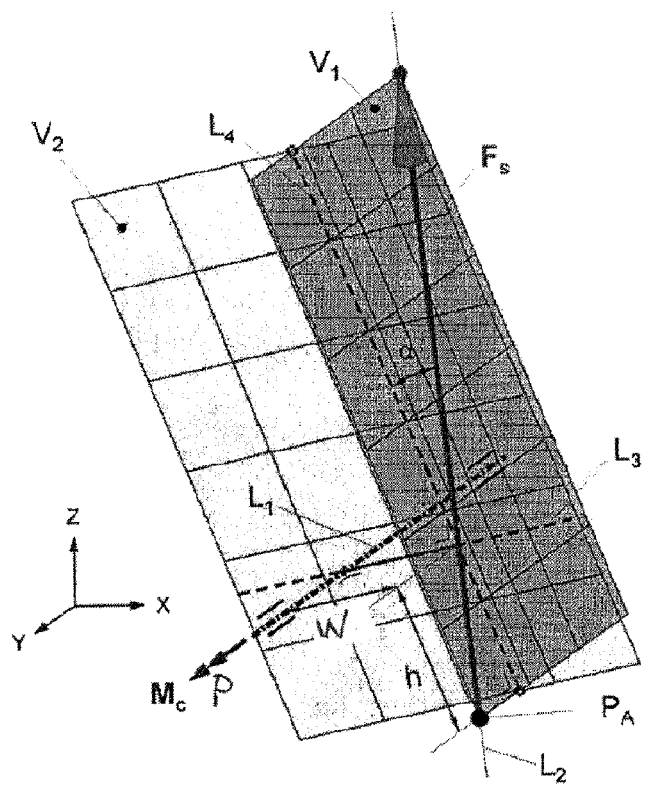
FIG. 9 schematically shows the relation between the spring force, its point of application and the directions in which this point of application can be moved in relation to the pivot axis.

This appropriate second direction will now be illustrated with reference to FIG. 9, showing a spring force $F_s$ in an arbitrary position with regard to a bearing arm of which only the pivot axis P is shown. Pivot axis P extends along line $L_1$ and spring force $F_s$ extends along line $L_2$. Lines $L_1$ and $L_2$ cross, but do not intersect. Between lines $L_1$, $L_2$ a shortest distance W can be defined, extending along line $L_3$, perpendicular to lines $L_1$ and $L_2$. Furthermore, two orthogonal planes $V_1$ and $V_2$ can be defined, wherein $V_1$ includes spring force $F_s$ and extends parallel to line $L_1$ and $V_2$ includes line $L_3$ and extends perpendicular to line $L_1$. The planes $V_1$, $V_2$ intersect along line $L_4$, which line $L_4$ includes an angle $\alpha$ with spring force $F_s$. The latter can be resolved in a component $F_s * \cos \alpha$, extending parallel to line $L_4$ and a component $F_s * \sin \alpha$ extending perpendicular thereto (not shown). The first component exerts a counter moment $M_c$ on the bearing arm, according to following equation:

$$M_c = W * F_s * \cos \alpha \quad (6)$$

As this equation includes no reference to the position of the point of application $P_a$ of the spring force $F_s$, said position can be freely shifted within plane $V_1$, without affecting the counter moment $M_c$, provided that the angle $\alpha$ between $F_s$ and line $L_4$ is kept constant. By shifting said point of application $P_a$ along plane $V_1$, the distance h between line $L_3$ and the projection of the point of application $P_a$ on plane $V_2$ will change (except when $P_a$ is shifted parallel to line $L_1$). By changing said distance h, the effective stiffness of $C_{\mathit{eff}}$ will be affected, according to following equation (7) (which resembles equation (2), derived for the two-dimensional (2D) embodiments of FIGS. 1A,C):

$$C_{\mathit{eff}} = \frac{(C_{spring} \cdot \cos^2 \alpha) \Delta x^2 + (F_0 \cos \alpha) \cdot \Delta z}{L^2} \quad (7)$$

For FIG. 9, $\Delta x$ equals W and $\Delta z$ equals h. Thus, in the embodiment according to FIG. 9, 'displacement of the point of application $P_a$ in an appropriate second direction' includes any displacement in plane $V_1$ provided said displacement is not parallel to $L_1$ and provided the angle $\alpha$ between force $F_s$ and line $L_4$ is kept constant.

Thus, for every point of operation, a unique combination of parameters W and h, or more generally $\Delta x$ and $\Delta z$, can be determined, which combination at the one hand produces a desired counter moment $M_c$ according to equation (6) and at the other hand produces a desired effective stiffness $C_{\mathit{eff}}$ according to equation (7).

Of course, in a similar way, it is also possible to alter the effective stiffness $C_{\mathit{eff}}$ without substantially affecting the counter moment $M_c$ on the bearing arm 3.

The above discussed inventive insight is applied in the schematic suspension assembly 101 according to FIGS. 4A-D. Parts similar to those in FIG. 1 have been denoted with similar reference numerals, increased by 100. The suspension assembly 101 comprises a triangular bearing arm 103, which is pivotally connected to a chassis 104, around a pivot axis P, and spring means 105, which are likewise attached to the chassis 104, at some distance above the bearing arm 103. The spring means 105 exert a spring force $F_s$ on the bearing arm 103 via an elongated member 108, such as for instance a rod or a string. Furthermore, adjustment means are provided (not shown), which can move an end of said elongated member 108 along a circular path C, thereby having the elongated member 108 describe a cone with centre line M. The member end can be rotated in clockwise direction (indicated by arrow $-\gamma$) or counter clockwise direction (indicated by arrow $+\gamma$) from a neutral position (indicated by $\gamma_0$), in which the elongated member 108 engages the bearing arm 103 at a certain distance from the pivot axis P, typically corresponding to a position in which the spring force $F_s$, in particular the pretension part $F_0$ thereof (cf. equation (1)) is in equilibrium with the static load acting on the free end of the bearing arm 103 (due to gravity). The rotation in $+\gamma$ and $-\gamma$ direction will cause the spring force $F_s$ to travel away from and towards the pivot axis P, thereby not altering the spring force Fs as such, and the counter moment $M_c$ exerted on the arm 103 to decrease, respectively increase. As explained in relation to FIGS. 1-3, such displacement of the spring force $F_s$ may cause the effective stiffness $C_{\mathit{eff}}$ of the suspension 101 to vary.

Figure 4B:
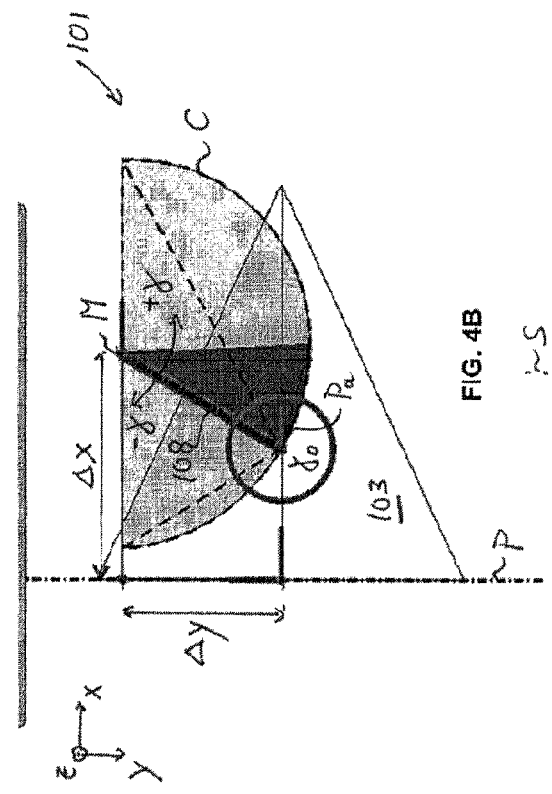
FIGS. 4A-D schematically show an alternative suspension assembly according to the invention, in frontal view, top view, perspective view and side view respectively, wherein the point of application of a real spring force is moved along a circular path, said circular path being tilted and offset in X-, Y- and Z-direction with respect to the bearing arm, thereby maintaining the effective stiffness of the suspension at a desired, substantially constant value when the point of application is travelled along said circular path.
Figure 4D:
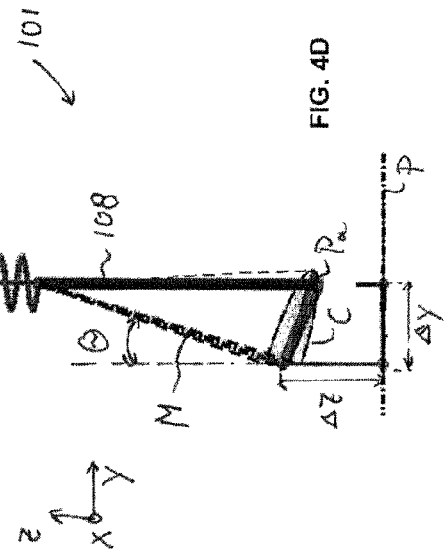
Figure 4A:
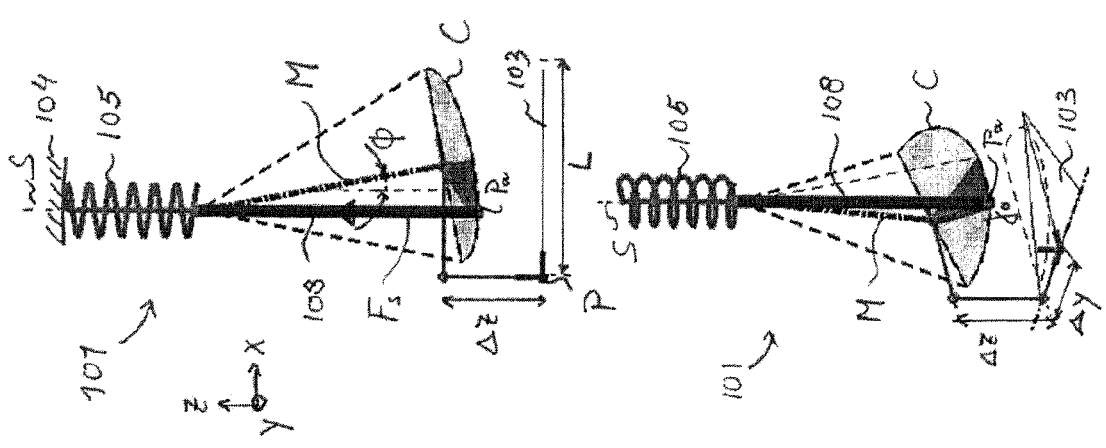
Figure 4C:
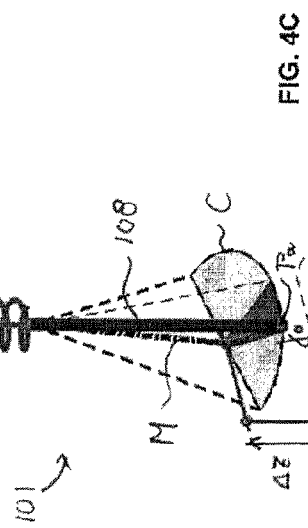
Figure 5:
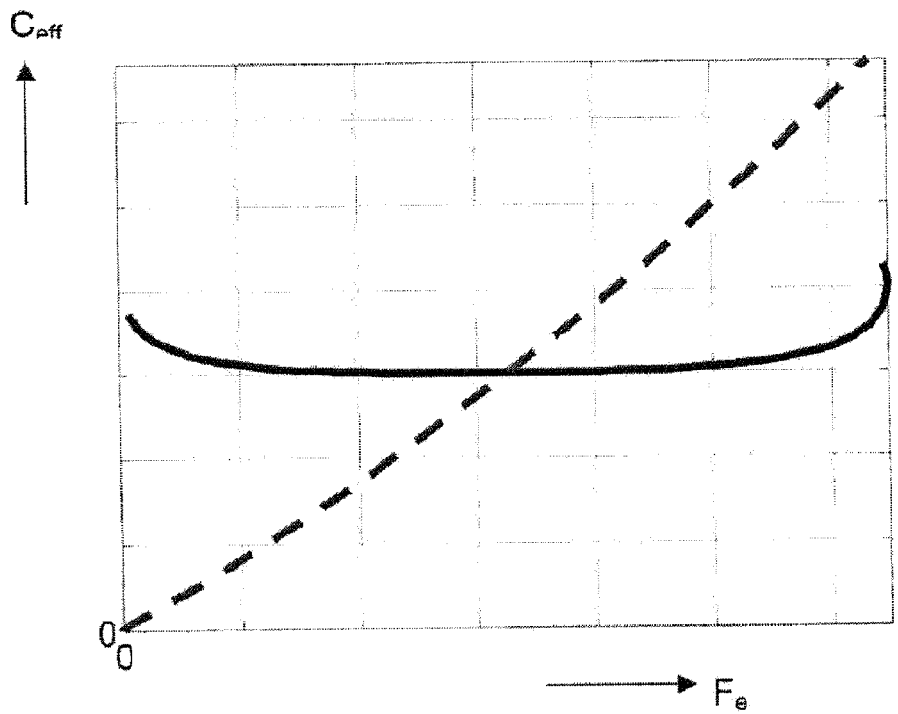
FIG. 5 shows the effective stiffness of the suspension assembly according to FIGS. 4A-D as a function of the spring force exerted on the bearing arm, at moment equilibrium for a substantially horizontal pose of the bearing arm.

In the given example, this is avoided by lifting the point of application $P_a$ of the elongated member 108 over a distance $\Delta z$ above the bearing arm 103, and by tilting the aforementioned centre line M of the cone slightly forward, around an axis extending parallel to the X-axis, and sideward, around an axis extending parallel to the Y-axis, so as to respectively include an acute angle $\Theta$ and an acute angle $\chi$ with the normal of the bearing arm 103 (as best seen in FIGS. 4D and 4A respectively). Thanks to this tilted orientation, the point of application $P_a$ of the elongated member 108 will move up en down in Z-direction when it is travelled along the circular path C, in accordance with the aforementioned inventive insight. Consequently, the effective stiffness $C_{\mathit{eff}}$ of the suspension assembly 101 can be kept substantially constant, at least over a considerable range of the bearing arm 103, as shown in FIG. 5, wherein the effective stiffness $C_{\mathit{eff}}$ only rises when the point of application $P_a$ of the elongated member 108 approximates the pivot axis P and the opposite end of the bearing arm 103. For comparison, the dashed line represents the effective stiffness $C_{\mathit{eff}}$ in case where the centre line M is not tilted but extends perpendicular to the triangular plane of the bearing arm 103.

Of course, the amount of displacement in the Z-direction for any given position of the spring force $F_s$ can be influenced by changing the or each tilt angle $\Theta$, $\Phi$ and/or the tilt axes of the centre line M. Thus, the graph of the effective stiffness $C_{\mathit{eff}}$, as shown in FIG. 5, can be changed as desired, in a similar way as explained for the suspension assembly 1 of FIGS. 1-3.

It is furthermore observed that in the present embodiment, for rotations of the elongated member 108 in the −γ direction the displacement ΔZ is positive, that is upward from the bearing arm 103, and for rotations in the +γ direction ΔZ is negative, that is downward from the bearing arm 103.

Figure 6A:
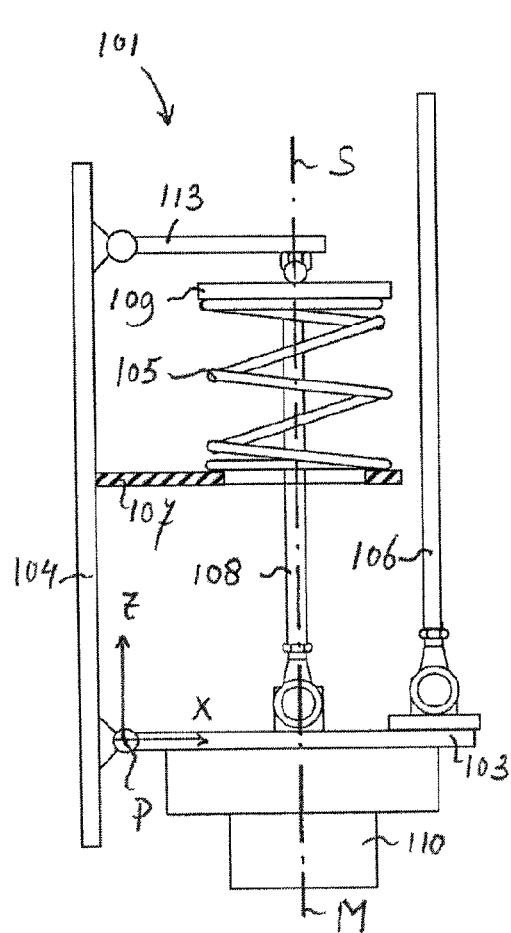
FIGS. 6A,B show one possible embodiment of the suspension according to FIGS. 4A-D, in cross sectional view and perspective view respectively.
Figure 6B:
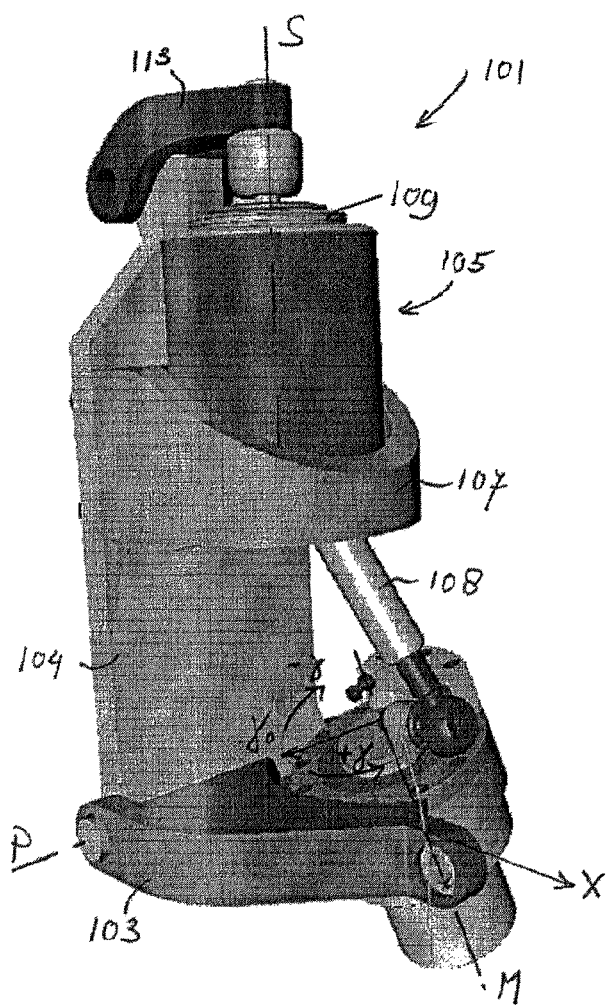

FIGS. 6A and B show a possible embodiment of the schematic suspension 101 of FIG. 4. Like parts have been denoted with like reference numerals. The embodiment is shown to comprise a bearing arm 103, which is pivotally connected to a chassis 104 around a pivot axis P. A coupling rod 106 is provided near its opposite end, for connection to a vehicle mass, for instance a cabin (see FIG. 8). Furthermore, spring means 105 are provided, mounted some distance above the bearing arm 103, on a support bracket 107 of the chassis 104, wherein a centre line S of the spring means 105 extends substantially perpendicular to the bearing arm 103 (under static load conditions, with the arm 103 extending substantially horizontal). The spring 105 exerts a spring force $F_s$ on the bearing arm 103 via an elongated member 108, which in the given example is designed as a pull rod but in alternative embodiments could be a flexible chord or string. The rod 108 has a bend shape, with a first end extending centrally through the spring 105 and the support bracket 107, and a second end extending from said support bracket 107 radially outward to the bearing arm 103. A cover plate 109 is seated on top of the spring 105 and connected to the pull rod 108 so as to compress the spring 105 against the support bracket 107, thereby causing pull rod 108 to be preloaded with a pulling force $F_s$. Of course, the connection between the cover plate 109 and the rod 108 may be adjustable, so as to allow said force Fs to be adjusted.

The pull rod 108, at its lower end is connected to adjustment means 110, more particular a rotary motor, designed to rotate said rod end along a segment of a circular path C, with centre line M. According to the invention, the motor 110 is fixated to the bearing arm 103 so as to have the centre line M tilt slightly forward relative to the plane of the bearing arm 103, i.e. around the X-axis. The centre line M may furthermore be tilted slightly sideward, to the left, around the Y-axis. Consequently, when travelling said circular path C, the end of the rod 108 will displace in X-direction (to and away from the pivot axis P) as well as in Z-direction. As explained in relation to FIG. 4, such displacement pattern may help to minimize variations in the effective stiffness $C_{\mathit{eff}}$ of the suspension.

To guide the rod movement in Z-direction, the upper end of the pull rod 108 is connected to a second arm 113, which can pivot in parallel to the bearing arm 103 and as such can function as a parallel guide mechanism. In order to allow the upper end of the pull rod 108 to rotate around the centre line S, relative to the second arm 113 and the spring means 105, use can be made of spherical bearing parts.

Preferably, the suspension 101 is dimensioned such that under static load conditions, i.e. when the vehicle is standing still or rides stationary and no acceleration or deceleration forces act on the suspended vehicle mass, the bearing arm 103 extends horizontally and the pull rod 108 extends halfway the bearing arm 103, in a neutral $γ_0$ position as shown in FIGS. 4 and 6A. In this position, the moment $M_c$ exerted on the bearing arm 103 by the spring force $F_s$ counterbalances the moment $M_e$ exerted on the bearing arm 103 by the load $F_e$ of the suspended vehicle mass 106. Furthermore, the tilt angles Θ and Φ of centre line M (see FIG. 4) are preferably chosen such that under said static load conditions the elongated member 108 extends substantially in line with the centre line S of the spring means 105 and substantially perpendicular to the bearing arm 103. This may help to minimize the radial forces acting on the elongated member 108 and reduce wear and friction between the member 108 and the guiding means that support the member 108 within the spring means 105.

The assembly 101 may further comprise a sensor (not shown) to measure one or more parameters that are representative for the external load $ΔF_e$, $ΔM_e$ on the bearing arm 103, such as for example an acceleration, velocity and/or displacement of the first vehicle mass 106. These measurement data are provided to a central control unit (not shown) that, based on these data, a desired load profile and/or a preprogrammed control strategy controls the adjustment means 110 to rotate the pull rod 108 clockwise or counter clockwise so as to decrease, respectively increase a distance Δx between the spring force $F_s$ and the pivot axis P, thereby allowing the dynamic load to be balanced, partly or completely, depending on the control strategy. During use, when driving over road irregularities, the cabin 106 must be able to move up and down with respect to the chassis 104. In this manner, road induced vibrations are absorbed by the suspension assembly 101. These relative motions cause the bearing arm 103 to rotate around the pivot axis. Consequently, the pull rod 108 will move upward or downward (depending on the direction of rotation), thereby guided by the second arm 113. This will cause the distance between the cover plate 109 and the support bracket 107 to increase or decrease, the spring 105 to relax or tension and consequently the spring force $F_s$ to increase or decrease.

Figure 7:
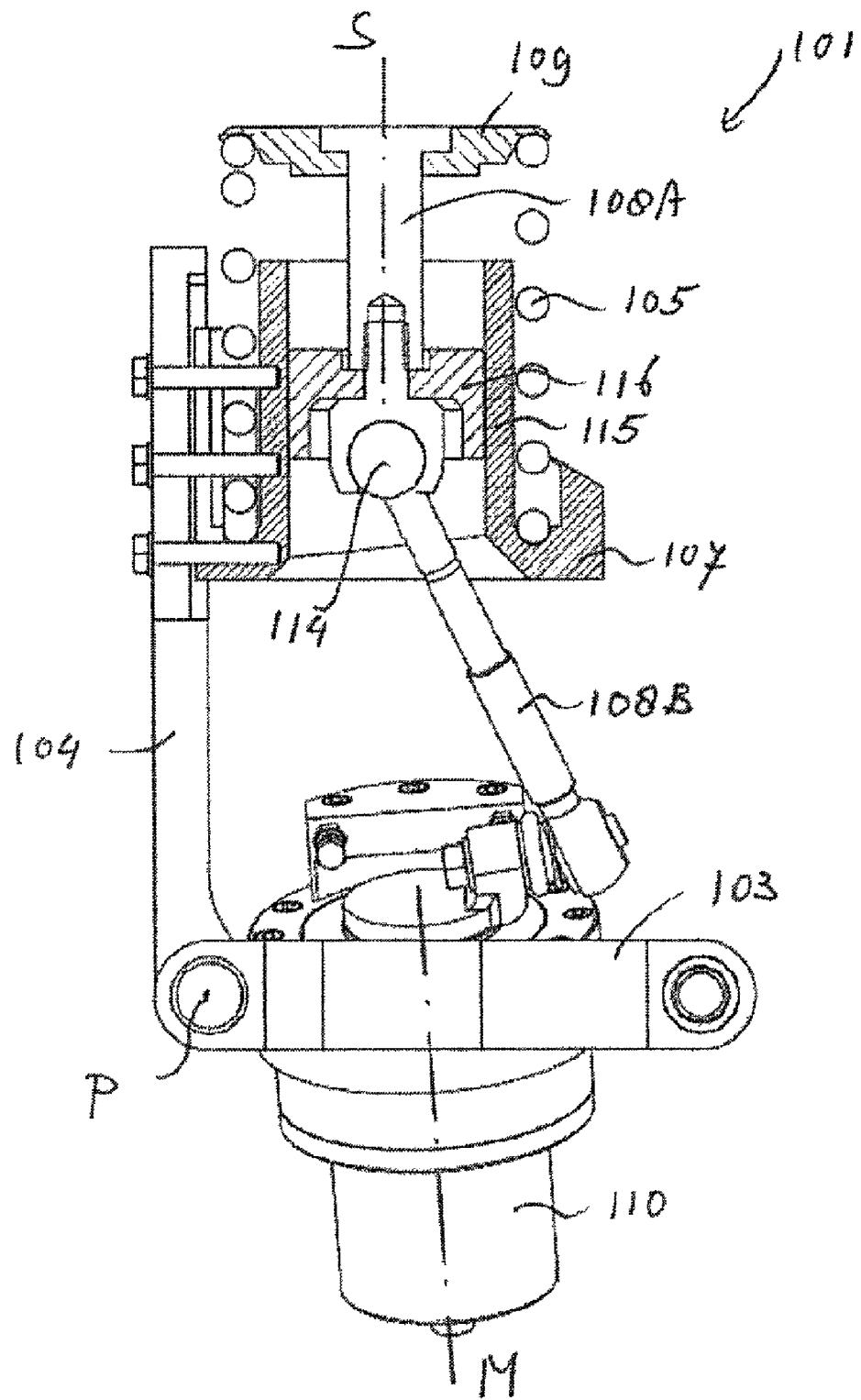
FIG. 7 shows another embodiment of the suspension according to FIGS. 4A-D, in perspective and partly cut away view.

FIG. 7 shows an alternative embodiment of a suspension 101 according to the invention. This embodiment differs from the embodiment shown in FIGS. 6A,B mainly in the way that the Z-movement of the elongated member 108 is facilitated. To that end, the support bracket 107 that supports the spring means 105 is designed to have a bushing 115 extending within said spring means 105. The elongated member 108 is made of an upper rod 108A and a lower rod 108B, which are linked together via a universal joint 114, somewhat halfway the bushing 115. Said joint 114 allows the upper rod 108A to extend centrally within the bushing 115 and the surrounding spring means 105, in alignment with the centre line S, whereas the lower rod 108B extends radially downward and outward, from the bushing 115 toward the bearing arm 103. The upper rod 108A is near its upper end connected to a cover plate 109, so as to compress spring 105 against said support bracket 107, and the lower rod 108B is near its lower end connected to adjustment means 110, in a similar fashion as described for the embodiment of FIGS. 6A,B. The universal joint 114 is encased within a cylindrical block 116 that is dimensioned to slide within the bushing 115 and thus can act as a bearing for guiding the rod 108 during its displacement in Z-direction. The working of the suspension 101 is similar to the embodiment of FIGS. 6A,B.

The invention is not in any way limited to the exemplary embodiments shown in the description and the figures.

For instance, the inventive insight may likewise be applied to 'non supporting' suspension assemblies, which in neutral position exert no counter moment $M_c$ on the bearing arm, like the embodiments disclosed in WO 93/22150. To support the external load in said neutral position, these type of suspension assemblies are equipped with an additional spring leg.

In the embodiment according to FIG. 1 of WO/93/22150, the inventive thought can be incorporated by tilting one of the guides (in which the spring 18 is moved sideward, parallel to itself) around an axis extending substantially perpendicular to the plane of the paper. In the embodiment according to FIG. 4 of WO 93/22150, the cone may be offset in the same directions and tilted around the same angles as discussed with regard to FIG. 4 of the present description. And in the embodiment according to FIG. 5 of WO 93/22150, the cone described by the auxiliary spring means 18, may be tilted in accordance with the present invention, by rotating the fixed hinge point 17 around the centre point of the circular base of the cone, in a plane that is defined by the centre line 33 of the cone and the centre line 11 of the two armed lever 20.

It is furthermore noted that in all embodiments described, the spring means could be rearranged to exert a pressure force on the bearing arm, instead of a tensile force. In such case, the point of application $P_a$ of the spring force $F_s$ should be moved in the opposite direction as to what has been described above, i.e. to increase the effective spring stiffness $\Delta z$ should be negative.

All combinations (of parts) of the embodiments shown and described are explicitly understood to be incorporated within this description and to fall within the scope of the invention. Moreover, many variations are possible within the scope of the invention, as outlined by the following claims.

What is claimed is:

1. Active suspension assembly (1, 101) for use in a vehicle to suspend a second vehicle mass (6, 106) to a first vehicle mass (4, 104), the assembly (1, 101) comprising a bearing arm (3, 103), spring means (5, 105) and adjustment means (110), wherein in use:
   the bearing arm (3, 103) is pivotally connected to the first vehicle mass (4, 104) around a pivot axis (P), to support the second vehicle mass (6, 106);
   the spring means (5, 105) produce a spring force ($F_s$), exerting a counter moment ($M_c$) on the bearing arm (3, 103); and
   the adjustment means (110) are arranged to vary said counter moment ($M_c$) by altering the direction of the spring force ($F_s$) and/or move its point of application ($P_a$) in a first direction, characterized in that the adjustment means (110) are furthermore arranged to move the point of application ($P_a$) of the spring force ($F_s$) in a second direction, in which the counter moment is not or hardly affected, but the effective spring stiffness ($C_{eff}$) of the suspension assembly (1, 101) is affected by the movement of the point of application ($P_a$), wherein the adjustment means (110) are further adapted to move the point of application ($P_a$) of the spring force ($F_s$) along a predetermined two dimensional path (QC), wherein a direction of a normal (M) of a plane accommodating said path includes an acute angle with both a direction (Y) of the pivot axis (P) and a direction (X) of the bearing arm (3, 103).

2. Suspension assembly (1, 101) according to claim 1, wherein the first direction is selected to cause a shortest distance (W) between the line of action of the spring force ($F_s$) and the pivot axis (P) to be increased or decreased, and wherein the second direction is selected to lie within a first plane ($V_1$), which extends perpendicular to the direction of said shortest distance (W) and contains the line of action of the spring force ($F_s$), and furthermore is selected to cause a distance (h) between the point of application ($P_a$) of the spring force ($F_s$) and a second plane through said shortest distance (W) and the pivot axis (P) to be increased or decreased in a predetermined way.

3. Suspension assembly (1, 101) according to claim 1, wherein the adjustment means (110) are arranged to move the point of application ($P_a$) of the spring force ($F_s$) along a predetermined path (Q, C), each point of said path (Q,C) representing a specific combination of a counter moment and a desired effective spring stiffness.

4. Suspension assembly (1, 101) according to claim 1, wherein the adjustment means (110) are arranged to move the point of application ($P_a$) of the spring force ($F_s$) along a predetermined linear path (Q).

5. Suspension assembly (1, 101) according to claim 1, wherein the adjustment means (110) are arranged to move the point of application ($P_a$) of the spring force ($F_s$) along a predetermined, two dimensional path (C).

6. Suspension assembly (101) according to claim 5, wherein the predetermined path is a circular path (C).

7. Suspension assembly (101) according to claim 6, wherein a centre line (M) of said circular path (C) includes an acute angle ( ) with a centre line (S) of the spring means (105).

8. Suspension assembly (101) according to claim 6, wherein a centre point of said circular path (C) is situated at a distance ($\Delta y$) from a centre point of the bearing arm (103) seen in Y-direction, extending parallel to the pivot axis (P).

9. Suspension assembly (1, 101) according to claim 1, wherein, under static load conditions, the point of application ($P_a$) of the spring force ($F_a$), is situated at a distance ($\Delta z$) above a plane defined by the pivot axis (P) and the bearing arm (3, 103).

10. Suspension assembly (1, 101) according to claim 1, wherein the adjustment means (110) are arranged to move the point of application ($P_a$) of the spring force ($F_s$) along a predetermined path (Q, C), causing the counter moment to vary between a minimum and a maximum value, while keeping the effective spring stiffness ($C_{eff}$) of the suspension assembly substantially constant.

11. Suspension assembly according to claim 1, wherein the adjustment means (110) are arranged to move the point of application ($P_a$) of the spring force ($F_s$) along a predetermined path (Q, C), causing the effective spring stiffness ($C_{eff}$) of the suspension assembly to increase with increased counter moment, so as to keep a natural frequency of the sprung second vehicle mass (6, 106) substantially constant.

12. Suspension assembly (1, 101) according to claim 1, wherein the spring force ($F_a$) is exerted on the bearing arm (3, 103) via an elongated member (108).

13. Suspension assembly (1, 101) according to claim 12, wherein the elongated member (108) is a string or a rod.

14. Suspension assembly (101) according to claim 12, wherein the elongated member (108) describes a cone during adjustment of the point of application ($P_a$).

15. Suspension assembly (101) according to claim 12, wherein the elongated member (108), under static load conditions, has its centre line aligned with the centre line (S) of the spring means (105).

16. Suspension assembly according to claim 12, wherein the elongated member (108), under static load conditions, extends substantially perpendicular to the bearing arm (103).

17. Suspension assembly (101) according to claim 12, wherein the spring means (105) comprise a guiding construction (107, 109, 113; 114, 115, 116) for guiding an end of the elongated member (108) within the spring means (105), so as to allow axial displacement of said end along a centre line (S) of the spring means (105).

18. Suspension assembly (1, 101), according to claim 1 wherein the spring means (5, 105) are pre-tensioned to produce a spring force ($F_s$), which may be a tensile force or a pressure force.

19. Suspension assembly (1, 101) according to claim 1, wherein the magnitude of the spring force ($F_s$) under static load conditions is adjustable.

20. Suspension assembly (1, 101) according to claim 1, wherein the counter moment, exerted on the bearing arm (3, 103) under static load conditions, is zero and an auxiliary spring is provided, to support the external load under said static load conditions.

21. Vehicle (2) comprising a chassis as the first vehicle mass (4, 104), a cabin or a wheel as the second vehicle mass, and an active suspension assembly (1, 101) according to claim 1, for suspending said second vehicle mass (6, 106) to the first vehicle mass (4, 104).

22. Active suspension assembly (1, 101) for use in a vehicle to suspend a second vehicle mass (6, 106) to a first vehicle mass (4, 104), the assembly (1, 101) comprising a bearing arm (3, 103), spring means (5, 105) and adjustment means (110), wherein in use:

the bearing arm (3, 103) is pivotally connected to the first vehicle mass (4, 104) around a pivot axis (P), to support the second vehicle mass (6, 106);

the spring means (5, 105) produce a spring force ($F_s$), exerting a counter moment ($M_c$) on the bearing arm (3, 103); and the adjustment means (110) are arranged to vary said counter moment ($M_c$) by altering the direction of the spring force ($F_s$) and/or move its point of application ($P_a$) in a first direction, characterized in that the adjustment means (110) are furthermore arranged to move the point of application ($P_a$) of the spring force ($F_s$) in a second direction, in which the counter moment is not or hardly affected, but the effective spring stiffness ($C_{eff}$) of the suspension assembly (1, 101) is affected by the movement of the point of application ($P_a$), wherein the adjustment means (110) are arranged to move the point of application ($P_a$) of the spring force ($F_s$) along a predetermined, three dimensional (3D-) path.

* * * * *